United States Patent

Harper

[15] 3,648,503

[45] Mar. 14, 1972

[54] BEADING MACHINE AND METHOD

[72] Inventor: Laffie Harper, San Bruno, Calif.

[73] Assignee: Veeder Industries, Inc., Hartford, Conn.

[22] Filed: Mar. 27, 1970

[21] Appl. No.: 23,156

[52] U.S. Cl. .................................72/84, 72/105, 72/110
[51] Int. Cl. ..........................................B21d 17/04
[58] Field of Search.................72/84, 105, 106, 107, 110, 72/383; 29/454

[56] References Cited

UNITED STATES PATENTS

| 220,991 | 10/1879 | Ross | 72/105 |
| 1,882,182 | 10/1932 | Dreyer | 72/105 |
| 2,809,687 | 10/1957 | Ogle | 72/105 |
| 3,435,651 | 4/1969 | McInnis | 29/454 |

Primary Examiner—Lowell A. Larson
Attorney—Boyken, Mohler, Foster & Schwab

[57] ABSTRACT

In a machine for forming an annular radially inwardly projecting bead in the cylindrical end portion of a tubular sheet metal fitting to provide the sidewalls and bottom of a radially outwardly opening channel, which machine includes male and female channel-forming power-driven rollers rotatable in opposite directions with a side of said cylindrical end portion between them, to rotate said portion and to form said bead. The male roller is floatingly supported for axial movement and is movable under force transversely thereof and radially of said cylinder toward the female roller and a rotating thrust surface axially engages the circular end edge of the tubular fitting adjacent to the male roller for progressively drawing the metal of said marginal portion to form a deeper channel than heretofore, during rotation of said rollers for rotating said tubular portion.

6 Claims, 5 Drawing Figures

Patented March 14, 1972
3,648,503
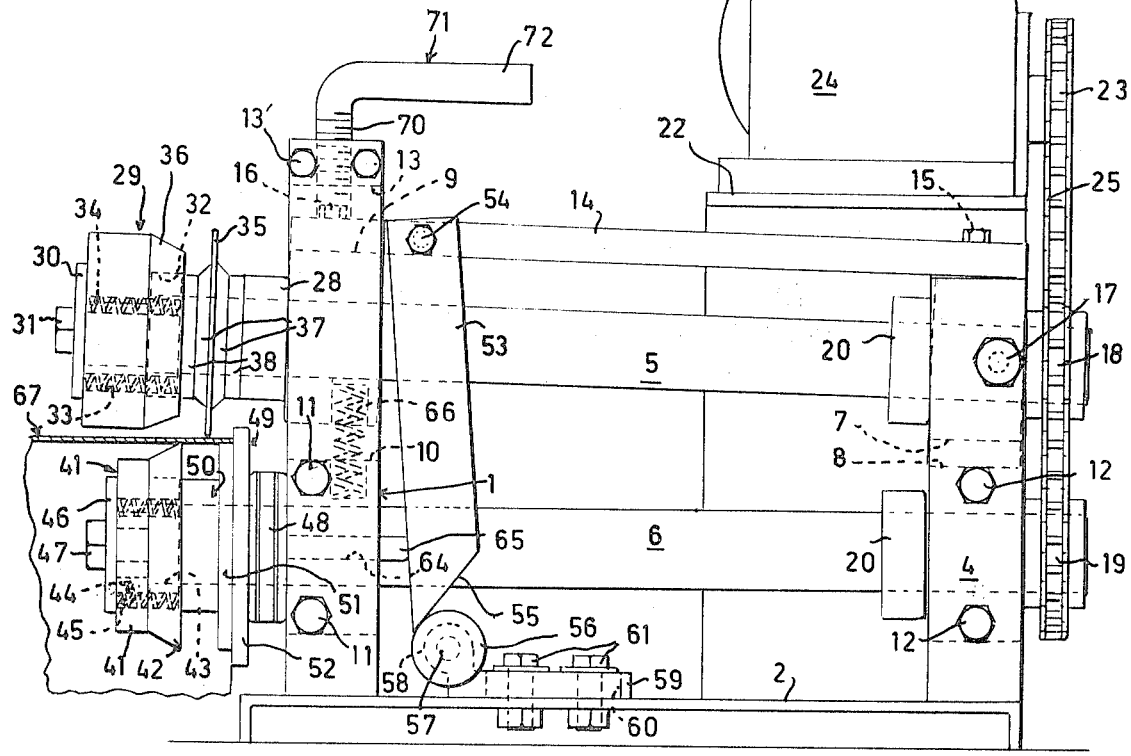
FIG.1
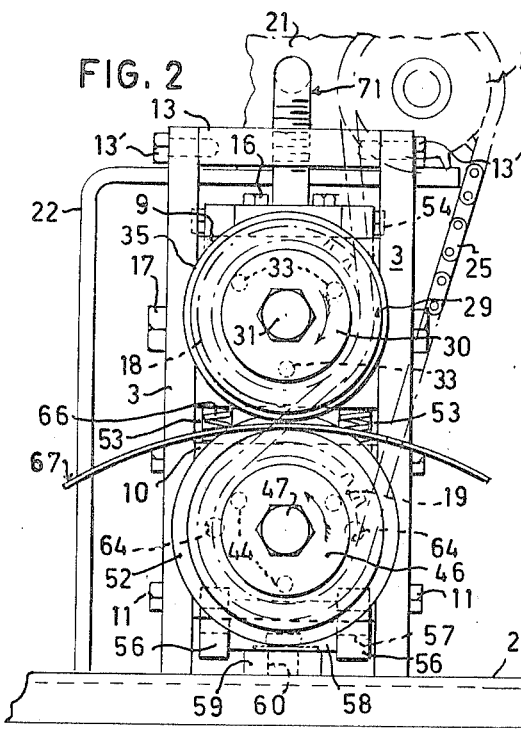
FIG.2
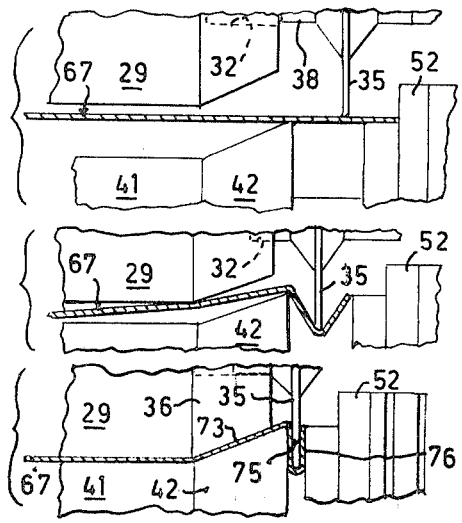
FIG.3
FIG.4
FIG.5
INVENTOR.
LAFFIE HARPER
BY
Boykin, Mohler, Foster & Schwab
ATTORNEYS

BEADING MACHINE AND METHOD

SUMMARY

In sheet metal duct systems for air conditioning, the ducts for carrying the air are commonly rectangular in cross-sectional contour and the take-off fittings are cylindrical. A common form for each such fitting is a cylinder of sheet metal formed with a radially inwardly projecting bead around one of the terminal ends thereof which bead has spaced, opposed, annular side walls and a bottom wall providing the walls of a radially outwardly opening annular channel for receiving the circular edge and marginal portion of a circular opening that is formed in one of the walls of the air duct. To install the fitting, the outer side wall of the bead is notched at one point permitting the edge of said marginal portion around the opening in the air duct to extend through said notch into the channel, and upon their rotating the fitting in one direction relative to the wall of the duct having said opening, the marginal portion of the duct around said opening will progressively enter the channel until it is fully within the channel, thus securing one end of the tubular fitting within the channel formed by the bead.

After the tubular fitting is in position, the operator may reach through the fitting and tap the outer wall of the channel toward the inner wall to tighten the outer wall against the portion of the duct wall that is within the channel.

The sheet metal fittings are normally 22–26 gauge, with 24 gauge being perhaps the most common. However, heretofore, it has not been possible to economically form beads or channels of greater depth than approximately one eighth inch.

While the structure and method of installing the take-off fittings has been widely used, the heretofore limitation in the depth of the channel capable of being economically formed in the bead has been a serious objection, inasmuch as the diameter of the circular opening for the fitting is normally relatively large and the edge defining the opening has variations.

One of the objects of the present invention is the provision of a simple, economically manufactured machine that is adapted to quickly form a bead in one end of a sheet metal fitting of standard gauges employed for such fittings, and which bead is of a radial depth several times substantially greater than the usual one-eighth inch depth, thereby enabling the economic manufacture of such fittings.

Another object is the provision of a method of drawing the sheet metal to form narrow relatively deep channels.

DESCRIPTION OF DRAWINGS

FIG. 1 is a side-elevational view of the machine in open position preparatory to forming a channel in a cylindrical fitting of sheet metal, one end of the sheet metal fitting being shown in cross section in position for forming the bead.

FIG. 2 is an end elevational view of the machine of FIG. 1 with the driving arrangement at the far end being shown in dot-dash lines and a portion of the sheet metal cylinder being shown in elevation.

FIG. 3 is an enlarged fragmentary cross-sectional view of the sheet metal and forming rollers at the bending point, but before bending.

FIG. 4 is a view similar to FIG. 3 showing the elements of FIG. 3 at an intermediate position during a bending operation, the sheet metal being shown in cross section.

FIG. 5 is a view similar to FIGS. 3, 4 showing the elements in the final bending position, the sheet metal being shown in cross section.

DETAILED DESCRIPTION OF MACHINE

The machine illustrated comprises frame generally designated 1 that includes a horizontal base 3 (FIGS. 1, 2) having a front pair of horizontally spaced, parallel, vertically elongated side plates 3 extending vertically upwardly from said base rigid with the latter at their lower ends. Spaced horizontally from said front pair of side plates is a rear pair of similarly extending and similarly arranged side plates 4 (FIG. 1) also rigidly secured at lower ends to base 2.

Upper and lower horizontally extending shafts, respectively designated 5, 6 extend at their ends between the front and rear pairs of side plates 3, 4, the rear ends of shaft 5, 6 being respectively rotatably supported in upper and lower bearing blades 7, 8, and the forward or front end portions of the shafts are rotatably supported in upper and lower bearing blocks 9, 10. Machine screws 11 secure the lower front bearing blocks rigid between plates 3, and screws 12 similarly secure the lower rear bearing block rigid with plates 4.

A rigid spacer block 13 (FIG. 2) is secured between the upper ends of the forward side plates by screws 14 respectively extending through the upper ends of side plates 3 and into said block.

The words "rear," "rearwardly," "front," "forward," "forwardly," and words of similar meaning are used with reference to the ends of the shaft that carry the bead forming elements, which are the ends that project outwardly of the pair of side plates 3 adjacent to bearing blocks 9, 10.

Said shafts 5, 6 project at their opposite ends forwardly and rearwardly from the bearing blocks that are respectively between the front side plates 3 and the rear side plates 4.

A horizontal bar 14 extends from the upper side of the upper rear bearing block 7 into the upper portion of the space between the front side plates 3, the rear end of said bar being secured to the upper side of the upper rear bearing block 7 by screws 15. The forward end of bar 14 is above and is secured to the upper front bearing block 9 by screws 16.

A pair of horizontal coaxial shoulder bolts 17 threadedly extend through the upper end portions of rear side plates 4 and into recesses formed in the opposite lateral sides of the upper rear bearing block 7 pivotally supporting said block and the rear end of bar 14 for swinging of forward ends of the bar 14 and shaft 5 about the axis of said bolts 17, the front upper bearing block 9 being supported between and guided by the front side plates 3 to permit said vertical movement of the bearing block 9.

Sprocket wheels 18, 19 are respectively secured on the rearwardly projecting ends of shafts 5, 6 and a collar 20 (FIG. 1) is secured on each shaft adjacent the forwardly facing sides of the bearing blocks 7, 8. A motor 21 supported above the rear pair of side plates 4 on a mount 22 rigid on base 1 drives a sprocket wheel 23 through reduction gears in a gear box 24, and a sprocket chain 25 connects sprocket wheel 23 with sprocket wheels 18, 19 for driving the latter, and consequently shafts 5, 6 in opposite directions (FIG. 2).

A collar 28 is secured on the forward end of the upper shaft 5 forwardly of the front upper bearing block 9, and a roller 29 is keyed on the forward end of shaft 5, spaced forwardly of collar 28. A circular end plate 30 is secured against the forwardly facing surface of roller 29 by a screw 31 threadedly secured in the outer end of said shaft, and coaxial with the latter.

Said roller 29 is cylindrical, except at its rear end and is counterbored on its rearwardly facing side to form a circular sided recess 32 (FIG. 1) and said roller 29 is also drilled to provide several parallel, axially extending, open-ended passageways 33 around its axis opening at one end into recess 32. Within each passageway 33 is an expansion coil spring 34. Plate 30 extends across the forward ends of passageways 33.

Floatingly supported on the shaft 5 between the roller 29 and collar 28 is a circular disc-like roller 35 of a diameter slightly greater than the maximum diameter of roller 29.

The rear end portion of roller 29 is conical, as at 36, (FIG. 1), extending convergently from the cylindrical forward outer end portion that is of maximum diameter, and the roller 35 has central hub portions 37 having radially outwardly facing surfaces extending convergently away from the parallel axially outwardly facing sides of the disc-like roller 35 to cylindrical hub portions 38. Said hub portions 38 are of diameters approximately the same as the inside diameter of recess 32 in roller 29 so that the hub 38 adjacent to said recess will move into the latter against the resistance of springs 34 upon movement of the roller 35 to a position in which the hub portion 38 that faces collar 28 is against the latter.

A roller 41 is keyed on the forward outer end of lower shaft 6, which roller has a cylindrical forward portion of the same diameter as the forward portion of roller 29, the latter being directly above said cylindrical portion of roller 41. The rear end portion 42 of roller 41 is directly below the tapered end portion 36 of roller 29, although slightly offset rearwardly relative to roller 29 (FIG. 3). The radially outwardly facing surface of portion 4 is tapered divergently outwardly in a rearward direction from the forward portion of roller 41.

Roller 41, including its rear end portion 42, is spaced forwardly from the front lower bearing block 10 and said portion 42 is tapered divergently outwardly in a rearward direction from the forward portion of roller 41, and said portion 42 is counterbored to form a circular rearwardly opening recess 43 coaxial with and around the forward end of shaft 6. Three axially extending open-ended bores or passageways 44 equally spaced around the axis of roller 41 open at one of their ends into recess 43 and coil springs 45 corresponding to springs 33 are held within said bores by an end plate 46 secured over the outer end of roller 41 by a screw 47.

A thrust bearing 48 is slidably supported on the forwardly projecting end of shaft 6 adjacent to and forwardly of the lower front bearing block 10, and a roller generally designated 49 is disposed between end roller 41 and said thrust bearing 48 and is slidable on the forwardly projecting end portion of shaft 6 axially thereof.

Roller 49 includes three coaxial cylindrical portions 50, 51, 52 of successively increasing diameters in a rearward direction away from the end roller 41. The portion 50 nearest roller 41 is of approximately the same diameter as that of recess 44 and adapted to move axially of shaft 6 into said recess, while the portion 51 adjoins portion 41 and is of an outer diameter between that of portion 50 and portion 52 and is of the same diameter as the maximum diameter of the enlarged rear end portion 42 of roller 41. The rear end portion 52 of roller 49 abuts the thrust bearing 48 and is of greater outside diameter than that of intermediate portion 51. Springs 45 in passageways 44 yieldably hold the roller 49 and the thrust bearing 48 against the forwardly facing side of the lower forward bearing block 10.

Corresponding generally vertically extending elongated arms 53 of a pair thereof are pivotally suspended from horizontal pivots 54 on the forward end of the bar 14, said arms being on opposite sides of said forward end of bar 14 and closely adjacent to the rear sides of the upper and lower bearing blocks 9, 10.

The terminal lower end surfaces 55 of said arms 53 (FIG. 1) are correspondingly inclined upwardly in a rearward direction from their lower front end edges (FIG. 1).

Cam rollers 56 of a pair thereof (FIG. 2) are respectively rotatably supported on coaxial stub shafts 57 on and projecting oppositely outwardly from the ends of a bar 58 (FIG. 1) which bar, in turn, is rigidly secured on the forward end of a horizontally elongated strip 59 (FIGS. 1, 2). Said strip 58 extends longitudinally of said base and is formed with a slot 60 (FIG. 2) extending longitudinally of the strip. Bolts 61 (FIG. 1) extend through said slot and are bolted to base 1 for securing the cam rollers in adjusted position in engagement with the lower inclined surfaces 55 of arms 53.

The lower forward bearing block 10 is formed with a pair of horizontal open-ended parallel passageways 64 at the same level, which passageways open at their forward ends behind the thrust bearing 48 and at their rear ends opposite to arms 53, and a pin 65 is slidably supported in each passageway.

When the thrust bearing 48 is against the forward side of the front lower bearing block 10 the rear end of said pins 65 will project rearwardly of the bearing block 10 to hold the arms 53 in rearwardly downwardly inclined positions (FIG. 1). When in this position, the cam rollers 56 will engage the lower inclined terminal end surfaces 55 of said arms. The adjusting screws 61 enable positioning the rollers in adjusted positions relative to said surfaces 55.

Corresponding coil springs 66 are disposed between the upper and lower front bearing blocks 9, 10 to yieldably urge the upper shaft 5 and rollers 29, 35 thereon, to an elevated position relative to the rollers 41, 49 on the lower shaft 6. When in this elevated position the upper side of a cylindrical sheet metal fitting, generally designated 67 (FIGS. 1, 3) may be positioned horizontally across and supported on the enlarged end of portion 42 of roller 41 and on portion 51 of roller 49 with the terminal end edge of said fitting in abutting relation to the axially forwardly facing side of portion 52 of roller 49 (FIGS. 1, 3).

As seen in FIG. 1 when the upper front bearing block 10 is yieldably urged upwardly by springs 66, it is adjacent to the rigid spacer block 13 that connects the upper ends of the front side plates 3. Said spacer block 13 is vertically tapped centrally between its ends for threadedly engaging the externally threaded depending arm 70 of a manually actuatable crank, generally designated 71. The other arm 72 of the crank extends laterally from the upper end of arm 70 for manual grasping for rotating the arm 70 and for moving the latter downwardly upon such rotation in one direction.

The depending arms 53 that are pivotally suspended at their upper ends from the forward end portion of bar 14 will hang in a downwardly rearwardly inclined position when the forward end portion of bar 14 is in its elevated position, said arms 53 being yieldably held in said position by springs 45 that yieldably urge the roller 49, thrust bearing 48 and pins 65 rearwardly.

FIGS. 1 and 3 illustrate the position of the rollers 29, 35, 41 and 49 at substantially the point where the relatively thin disc roller 35 initially engages the rear marginal portion of the upper side of a sheet metal fitting 67. The sheet metal fitting may be manually positioned and held until the bending commences.

A fractional manual rotation of the crank 71 will result in a downward bend in the marginal portion of the fitting 67 which will continue around the full circumference of the fitting along the line of engagement between the outer periphery of the roller 35, thus forming a shallow radially outwardly opening recess that will become progressively deeper as the roller 35 is moved downwardly by actuation of crank 71. The crank is preferably actuated intermittently to effect a complete 360° rotation of the fitting between each successive lowering of the roller 35 by actuation of crank 71, and with each such downward movement the cam rollers 56 will affect forward movement of portion 52 of roller 49 against the terminal end edge of fitting 47 by reason of the forward movement of pins 65 and roller 35 will automatically progressively move forwardly on the shaft as it follows the initial annular bend formed thereby in the marginal portion of the fitting 67 (FIG. 4).

As the upper rollers 29, 35 are moved downwardly the substantially correspondingly inclined surfaces on portions 36, 42 of rollers 29, 41 will engage the fitting and will outwardly bend the marginal portion of the fitting along the bead or channel to provide an outwardly flaring portion 73 (FIG. 5) along the bead, the latter providing the radially outwardly opening channel 75 into which the circular marginal portion around a circular opening in a sheet metal wall will fit and be threaded through a notch cut in the outer side wall 76 after the channel is formed.

The increased depth in the channel of the bead obtained by the present method and apparatus is due to the manner of progressively drawing the metal by the floating roller 35 and the rollers that cooperate therewith.

The purpose of the outwardly flared portion 73 is to reduce resistance to air passing through the fitting due to the bead in which channel 75 is formed.

This method may be broadly defined as being one in which a radially opening channel having parallel, spaced, opposed side walls and a bottom wall is formed in a cylindrical wall of sheet metal by progressively drawing adjoining annular sections of said cylindrical wall respectively equal in width to the width of said side walls radially relative to the axis of said cylinder along a line of bend at the juncture between said sections by application of a force applied radially of said cylinder along said line and rotating said cylinder in one direction about its axis, and at the same time holding said cylinder at one side of said sections against movement radially and axially of said cylinder, and intermittently during application of said radial pressure shifting said pressure at said line in a direction toward the portion of the cylinder in said last-mentioned direction against the section at the side line of bend opposite to said one side of said sections.

I claim:

1. The method of forming a radially opening annular channel having opposed side walls and a bottom wall in the cylindrical wall of a sheet metal cylinder comprising the steps of:
    a. progressively drawing adjoining annular sections of said cylindrical wall respectively equal in width to the width of said side walls radially relative to the axis of said cylinder along a line of bend at the juncture between said sections by application of a force applied radially of said cylinder and rotating said cylinder about its axis in one direction at the same time,
    b. holding said cylinder at one side of said sections against movement axially of said cylinder, and progressively shifting the point of application of said force at said line in a direction toward the portion of said cylinder at said one side of said sections during said radial application of said force and at the same time,
    c. applying axial pressure in said last-mentioned direction against the section at the side of said line opposite to said one side of said sections until said sections are in opposed relation defining the opposed side walls of said channel with said bottom wall thereof along said line of bend.

2. The method as defined in claim 1;
    d. said force and said pressure being applied intermittently until said walls are in substantially parallel planes, and
    e. said force being applied radially inwardly relative to the axis of said cylinder so that said channel will open radially outwardly of said axis, and
    f. said section of said cylinder that is at the side of said line opposite to said one side of said sections terminating in a free edge, whereby said channel will be formed in one end of said cylinder.

3. A machine for forming a radially opening relatively deep, narrow annular channel in one end of the cylindrical wall portion of a sheet metal cylindrical take-off fitting for securement in an opening in an air conditioning duct comprising;
    a. a first roller having an outer, annular marginal portion conforming to the cross-sectional contour of the inside of said channel, and having an outer circular edge for engaging the outer side of said cylindrical wall portion at one side of the axis of said cylinder,
    b. cylinder-engaging means comprising a pair of axially spaced, coaxial rollers supported for rotation about their axes in a position for engaging the inner side of said cylindrical wall portion opposite to said edge on said first roller at points spaced at opposite sides of the point of engagement between said edge on said first roller and said cylindrical wall portion with the space between said pair of rollers being free for drawing the material of said cylindrical wall portion thereinto under radial movement of said edge on said first roller against said cylindrical wall portion into said space,
    c. separate means respectively supporting said first roller, and said pair of rollers, for rotation about their respective axes and supporting said first roller and one of the rollers of said pair for axial movement in the same direction toward the other roller of said pair during said rotation thereof, and means operatively connected with said first roller and with said pair of rollers for simultaneously rotating said first roller in a direction opposite to the direction of rotation of said pair of roller to thereby rotate said cylinder in one direction about the axis of the latter when said cylindrical wall portion is engaged between said first roller and said pair of rollers,
    d. holding means including said other roller of said pair for holding the part of said cylinder adjoining and at one side of said cylindrical wall portion against axial movement during rotation of said cylinder and the formation of said channel in said cylindrical wall portion,
    e. means for simultaneously progressively moving said first roller toward said space for moving said marginal portion on said first roller into said space between said pair of rollers and for moving said one of said pair of rollers toward said other roller during said rotation of said rollers, whereby said first roller will be automatically moved toward said other roller of said pair and said cylindrical wall portion will be drawn to channel form along a line extending around said cylindrical wall portion at the point of engagement between the outer edge of said marginal portion of said first roller and said cylindrical wall portion.

4. In a machine as defined in claim 3;
    f. said separate means comprising a first and a second power driven shaft in side-by-side relation with said first roller on said first shaft and said pair of rollers on said second shaft,
    g. means supporting said second shaft for rotation about a fixed axis and means supporting said first shaft for movement of the portion thereof having said first roller thereon toward said second shaft for moving said marginal portion of said first roller into said space between said pair of rollers.

5. In a machine as defined in claim 3;
    f. said one of the rollers of said pair including a portion thereof engageable with the terminal end edge of said cylinder when said cylindrical wall portion is supported in engagement with said pair of rollers at said spaced points and
    g. said portion of said one of said rollers being movable axially with said one of said rollers toward the other roller of said pair for applying axial pressure against said cylindrical wall portion as said marginal portion on said first roller is moved into said space and while said holding means is in said holding relation to said cylinder.

6. In a machine as defined in claim 3;
    f. said marginal portion on said first roller being relatively thin and having parallel opposite axially facing surfaces and the spacing of said marginal portion on said first roller from said points of engagement of said cylindrical portion with pair of rollers when the latter are at their maximum distance apart being approximately equal to the depth of the channel to be formed, and
    g. means for yieldably holding said pair of rollers at their maximum distance apart and for holding said first roller with its said marginal portion at a point approximately centrally between said pair of rollers and for holding said marginal portion on said first roller out of said space prior to said movement of said marginal portion into said space.

* * * * *